(12) United States Patent
Tokimasa et al.

(10) Patent No.: US 11,021,155 B2
(45) Date of Patent: Jun. 1, 2021

(54) VEHICLE CONTROL APPARATUS AND VEHICLE CONTROL METHOD

(71) Applicants: DENSO CORPORATION, Kariya (JP); TOYOTA JIDOSHA KABUSHIKI KAISHA, Toyota (JP)

(72) Inventors: Mitsuhiro Tokimasa, Kariya (JP); Takuma Sudo, Kariya (JP); Takashi Maeda, Nagoya (JP); Takeshi Nanami, Toyota (JP); Minoru Nakadori, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 16/313,378

(22) PCT Filed: Jun. 15, 2017

(86) PCT No.: PCT/JP2017/022199
§ 371 (c)(1),
(2) Date: Dec. 26, 2018

(87) PCT Pub. No.: WO2018/003529
PCT Pub. Date: Jan. 4, 2018

(65) Prior Publication Data
US 2019/0193739 A1    Jun. 27, 2019

(30) Foreign Application Priority Data

Jun. 27, 2016 (JP) .............................. JP2016-127020

(51) Int. Cl.
*B60W 30/18* (2012.01)
*G08G 1/16* (2006.01)
(Continued)

(52) U.S. Cl.
CPC ....... *B60W 30/18163* (2013.01); *B60K 31/00* (2013.01); *B60Q 1/346* (2013.01);
(Continued)

(58) Field of Classification Search
CPC .......... B60W 30/18163; B60W 40/02; B60W 40/04; B60W 30/165; B60W 2554/4041;
(Continued)

(56) References Cited

U.S. PATENT DOCUMENTS 7,363,140 B2 * 4/2008 Ewerhart .............. B60W 30/16
701/96
9,254,846 B2 * 2/2016 Dolgov ................. B60W 30/16
(Continued)

FOREIGN PATENT DOCUMENTS

| JP | 2012001042 A | 1/2012 |
| JP | 5045637 B2 | 10/2012 |
| JP | 2016103222 A | 6/2016 |

*Primary Examiner* — Michael C Zarroli
(74) *Attorney, Agent, or Firm* — Maschoff Brennan

(57) ABSTRACT

A vehicle control apparatus performs during-following control in which, when a direction indicator of an own vehicle is operated during traveling in which a preceding vehicle is followed, the own vehicle is accelerated in conjunction with the operation of the direction indicator. An adjacent vehicle selecting unit selects, from other vehicles present ahead of the own vehicle, an adjacent vehicle traveling in an adjacent lane adjacent to a traveling lane of the own vehicle based on a lateral position that is a relative position relative to the own vehicle in a direction orthogonal to a travelling direction of the own vehicle and a relative distance to the own vehicle in the travelling direction. An acceleration control unit performs acceleration of the own vehicle by the during-following control based on whether or not the adjacent vehicle is selected when the direction indicator is operated during following-traveling.

9 Claims, 5 Drawing Sheets

(51) Int. Cl.
*B60W 30/12* (2020.01)
*B60K 31/00* (2006.01)
*G06T 7/70* (2017.01)
*B60Q 1/34* (2006.01)
*B60W 40/04* (2006.01)
*G06K 9/00* (2006.01)
*B60W 30/165* (2020.01)
*B60W 40/02* (2006.01)

(52) U.S. Cl.
CPC .......... *B60W 30/165* (2013.01); *B60W 40/02* (2013.01); *B60W 40/04* (2013.01); *G06K 9/00798* (2013.01); *G06T 7/70* (2017.01); *B60W 30/12* (2013.01); *B60W 2420/42* (2013.01); *B60W 2554/4041* (2020.02); *G06K 2209/23* (2013.01); *G06T 2207/30252* (2013.01); *G08G 1/167* (2013.01)

(58) Field of Classification Search
CPC ... B60W 2420/42; B60W 30/12; B60K 31/00; G06T 7/70; G06T 2207/30252; B60Q 1/346; G06K 9/00798; G06K 2209/23; G08G 1/167
See application file for complete search history.

(56) References Cited

U.S. PATENT DOCUMENTS

| | | | |
|---|---|---|---|
| 10,013,882 B2* | 7/2018 | Fujii | B60W 30/18163 |
| 10,328,935 B2* | 6/2019 | O'Dea | B60W 30/143 |
| 10,529,231 B2* | 1/2020 | Scofield | G06F 16/29 |
| 2005/0256630 A1 | 11/2005 | Nishira et al. | |
| 2015/0213718 A1 | 7/2015 | Ono | |

* cited by examiner

FIG.2
(a) NO ADJACENT VEHICLE
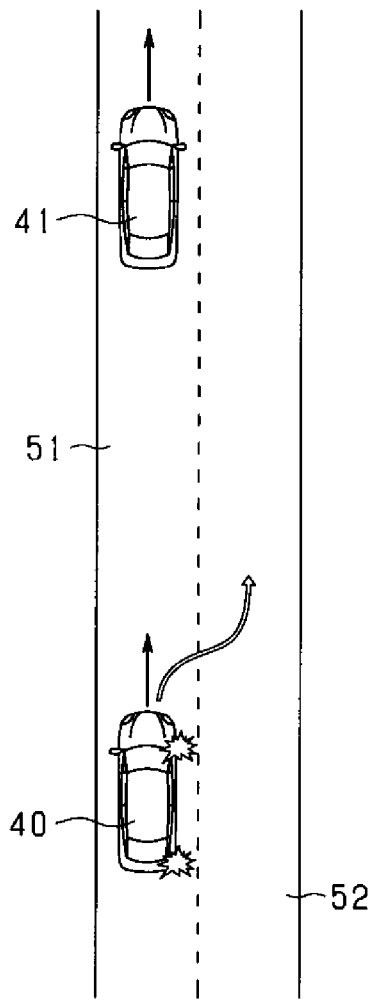
(b) ADJACENT VEHICLE PRESENT
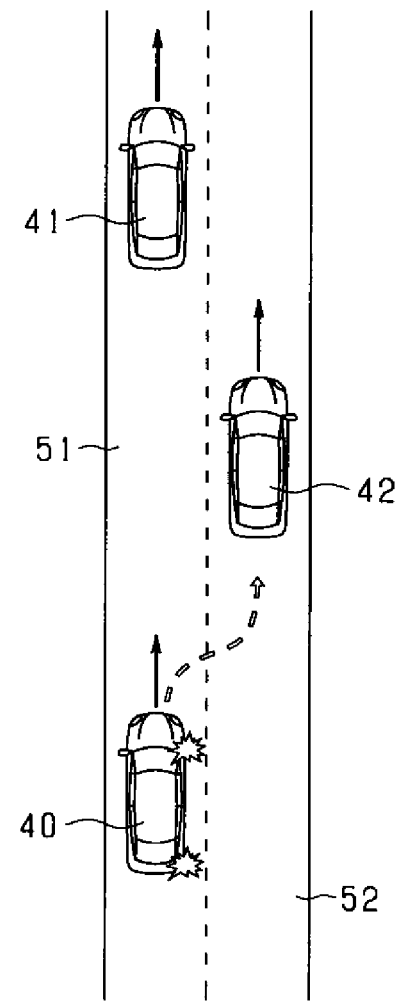

FIG.3 NO BOUNDARY LINE RECOGNIZED
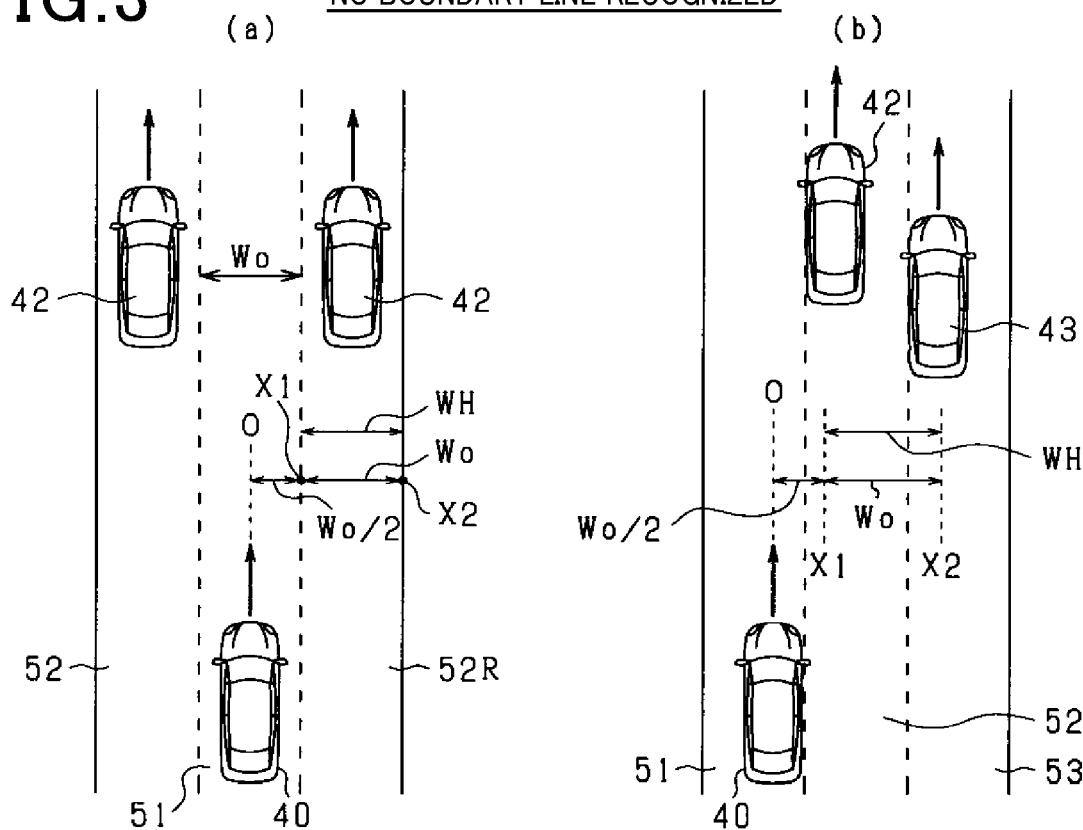
FIG.4 BOUNDARY LINE RECOGNIZED
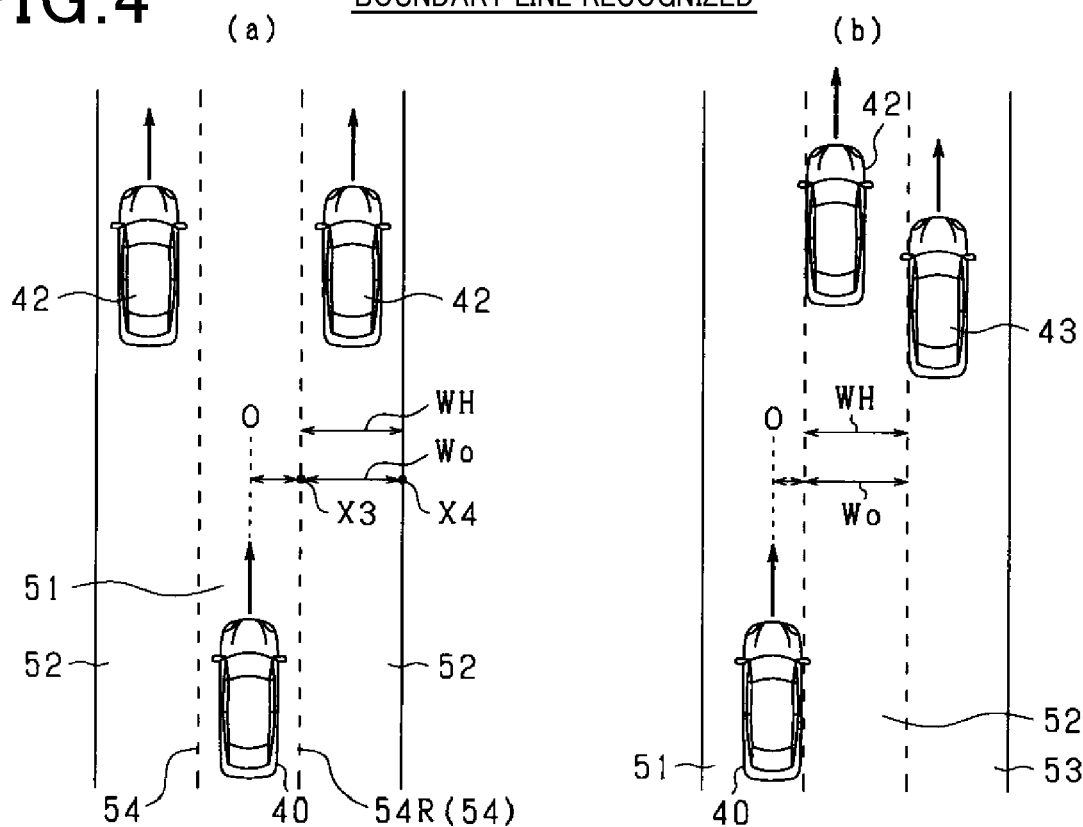

VEHICLE CONTROL APPARATUS AND VEHICLE CONTROL METHOD

CROSS-REFERENCE TO RELATED APPLICATIONS

The present application is a national stage application of PCT Application No. PCT/JP2017/022199, filed on Jun. 15, 2017, which claims priority to based on Japanese Patent Application No. 2016-127020, filed on Jun. 27, 2016, the descriptions of which are incorporated herein by reference.

TECHNICAL FIELD

The present disclosure relates to a vehicle control apparatus and a vehicle control method. Specifically, the present disclosure relates to a vehicle control apparatus that performs acceleration control in which, when a direction indicator of a vehicle is operated, the vehicle is accelerated in conjunction with the operation of the direction indicator, and a vehicle control method.

BACKGROUND ART

As a type of travelling assistance control of a vehicle, following control is known (for example, refer to PTL 1). In the following control, a vehicle that is traveling on a route of an own vehicle is selected as a preceding vehicle from vehicles that are traveling ahead of the own vehicle, and the own vehicle travels so as to follow the selected preceding vehicle. PTL 1 discloses that, when the direction indicator of the own vehicle is operated while following control regarding the preceding vehicle is being performed, the operation of the direction indicator is considered to be an indication of an intention by a driver to overtake preceding vehicle, and control to accelerate the own vehicle is performed. In addition, in a control apparatus described in PTL 1, when the direction indicator of the own vehicle is operated, the own vehicle is accelerated after an elapse of a predetermined amount of time. In addition, as a result of the predetermined amount of time until the start of acceleration being changed based on the direction indicated by the direction indicator, acceleration is performed at an appropriate timing based on a state of a road.

CITATION LIST

Patent Literature

[PTL 1] Japanese Patent Publication No. 5045637

SUMMARY OF INVENTION

When the driver operates the direction indicator and attempts to perform a lane change, a vehicle may be present ahead of the own vehicle in an adjacent lane that is adjacent to a traveling lane of the own vehicle. When the own vehicle is accelerated in such cases, deceleration of the own vehicle may be required immediately after acceleration. In this case, vehicle behavior differing from the intention of the driver and the driver experiencing discomfort are a concern.

The present disclosure has been achieved in light of the above-described issues. An object of the present disclosure is to provide a vehicle control apparatus that is capable of achieving vehicle behavior that matches the feeling of a driver when an own vehicle is accelerated in conjunction with an operation of a direction indicator, and a vehicle control method.

In the present disclosure, the following means are used to solve the above-described issues.

A first exemplary embodiment of the present disclosure is related to a vehicle control apparatus that performs during-following control in which, when a direction indicator of an own vehicle is operated during traveling in which a preceding vehicle is followed, the own vehicle is accelerated in conjunction with the operation of the direction indicator. The vehicle control apparatus includes: an adjacent vehicle selecting unit that selects, from other vehicles that are present ahead of the own vehicle, an adjacent vehicle that is traveling in an adjacent lane that is adjacent to a traveling lane of the own vehicle based on a lateral position that is a relative position relative to the own vehicle in a direction orthogonal to a travelling direction of the own vehicle and a relative distance to the own vehicle in the travelling direction of the own vehicle; and an acceleration control unit that performs acceleration of the own vehicle by the during-following control based on whether or not the adjacent vehicle is selected by the adjacent vehicle selecting unit when the direction indicator is operated during following-traveling.

In the above-described configuration, the configuration is such that a vehicle that is traveling in an adjacent lane of the own vehicle is identified based on the lateral positions and relative distances of other vehicles with reference to the own vehicle, and selected as the adjacent vehicle. Acceleration of the own vehicle when the direction indicator is operated is performed based on whether or not the adjacent vehicle is selected. When the own vehicle is accelerated in accompaniment with the operation of the direction indicator of the own vehicle regardless of a vehicle being present in the adjacent lane ahead of the own vehicle, deceleration of the own vehicle may be required immediately after acceleration. Meanwhile, when an adjacent vehicle is not present, it is preferable that smooth overtaking of a preceding vehicle be able to be actualized by acceleration of the own vehicle in accompaniment with the operation of the direction indicator of the own vehicle being proactively performed. In this regard, as a result of the above-described configuration, whether or not to accelerate the own vehicle can be determined based on the presence/absence of a vehicle present in the adjacent lane. Consequently, vehicle behavior that matches the feeling of the driver can be achieved.

BRIEF DESCRIPTION OF DRAWINGS

The above-described object, other objects, characteristics, and advantages of the present disclosure will be further clarified through the detailed description below, with reference to the accompanying drawings. The drawings are as follows:

FIG. 2 is a diagram of a case in which an adjacent vehicle is not present and a case in which an adjacent vehicle is present during acceleration;

FIG. 3 is a diagram of an adjacent vehicle selection area during non-recognition of a boundary line:

FIG. 4 is a diagram of the adjacent vehicle selection area during recognition of a boundary line:

DESCRIPTION OF EMBODIMENTS

Figure 1:
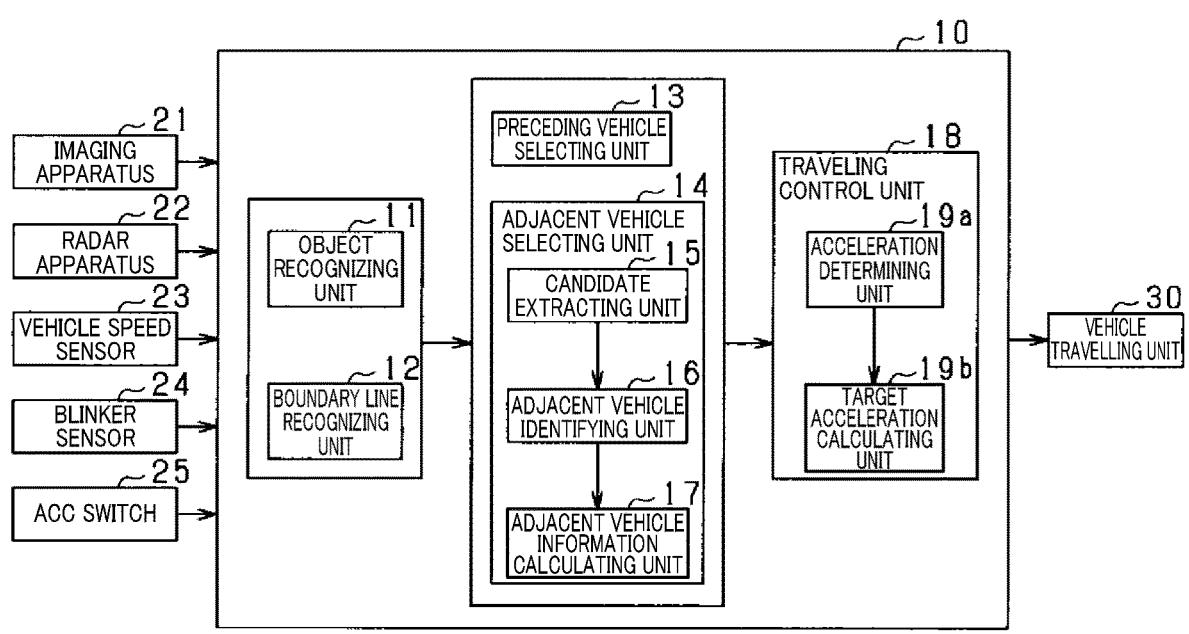
FIG. 1 is a block diagram of an overall configuration of a vehicle traveling control system.

Embodiments realizing a vehicle control apparatus will hereinafter be described with reference to the drawings. Sections that are identical or equivalent to each other among the embodiments below are given the same reference numbers in the drawings. Descriptions of sections having the same reference numbers are applicable therebetween.

The vehicle control apparatus according to the present embodiment is mounted in a vehicle. The vehicle control apparatus provides an adaptive cruise control (ACC) function and performs following control in which an own vehicle travels so as to follow a preceding vehicle that is traveling ahead of the own vehicle on a route of the own vehicle. First, an overall configuration of the present system will be described with reference to FIG. 1.

A vehicle control apparatus 10 in FIG. 1 is a computer that includes a central processing unit (CPU), a read-only memory (ROM), a random access memory (RAM), an input/output (I/O), and the like. The CPU actualizes each function by running a program that is installed in the ROM. The ROM corresponds to a computer-readable recording medium that functions as a non-transitory, tangible recording medium. An imaging apparatus 21 and a radar apparatus 22 are mounted in the vehicle (own vehicle) as object detection apparatuses that detect an object that is present in the vehicle periphery. Detection information of the object is inputted from the object detection apparatus and the vehicle control apparatus 10 performs following control to follow the preceding vehicle based on the inputted detection information.

The imaging apparatus 21 is an onboard camera and is configured by a charge-coupled device (CCD) camera, a complementary metal-oxide semiconductor (CMOS) image sensor, a near-infrared camera, or the like. The imaging apparatus 21 captures an image of a peripheral environment including a traveling road of the own vehicle, generates image data expressing the captured image, and successively outputs the image data to the vehicle control apparatus 10. The imaging apparatus 21 is attached at a predetermined height in a vehicle-width-direction center of the vehicle. The imaging apparatus 21 captures an image of an area that spreads ahead of the own vehicle with a predetermined imaging angle range, from a bird's-eye-view perspective.

The radar apparatus 11 is a detection apparatus that transmits electromagnetic waves as transmission waves and detects an object by receiving reflected waves of the transmission waves. According to the present embodiment, a millimeter-wave radar is mounted as the radar apparatus 22. The radar apparatus 22 is attached to a front portion of the own vehicle. The radar apparatus 22 scans an area that spreads ahead of the own vehicle with a predetermined angular range with an optical axis as the center, using radar signals. The radar apparatus 22 generates distance measurement data based on an amount of time from when an electromagnetic wave is transmitted ahead of the own vehicle until a reflected wave is received. The radar apparatus 22 successively outputs the generated distance measurement data to the vehicle control apparatus 10. The distance measurement data includes information related to an orientation at which the object is present, a distance to the object, and a relative speed.

The vehicle control apparatus 10 receives the image data from the imaging apparatus 21 and the distance measurement data from the radar apparatus 22. In addition, the vehicle control apparatus 10 receives respective detection signals from various sensors and switches provided in the vehicle. As the various sensors and switches, a vehicle speed sensor 23 that detects vehicle speed, a blinker sensor 24 that detects which of a "right indication position," a "left indication position." and a "non-operating position" an operating position of a direction indicator (blinker) of the own vehicle is in and outputs a detection signal thereof, an ACC switch 25 that is an input switch for the driver to select execution/non-execution of a following control mode, and the like are provided.

When the ACC switch 25 is turned on, when a preceding vehicle is present, to make the own vehicle follow the preceding vehicle, the vehicle control apparatus 10 performs acceleration and deceleration control such that a distance between the own vehicle and the preceding vehicle is fixed, with a preset vehicle speed set by the driver as an upper-limit vehicle speed. Specifically, the vehicle control apparatus 10 sets a target acceleration such that an inter-vehicle distance between the own vehicle and the preceding vehicle becomes closer to a target inter-vehicle speed set by the driver, and performs acceleration control of the own vehicle based on the set target acceleration. Meanwhile, when a preceding vehicle is not present, the vehicle control apparatus 10 performs control in which the speed of the own vehicle is maintained at a fixed speed so as to be the preset vehicle speed by the driver, a speed limit of the road, or the like. Instead of the target inter-vehicle distance, a target inter-vehicle time that is a value obtained by the target inter-vehicle distance being divided by the own vehicle speed may be used.

When the blinker of the own vehicle is operated to the "right indication position" or the "left indication position" from the "non-operating position" during travel in which a preceding vehicle is followed, the vehicle control apparatus 10 of the present system accelerates the own vehicle for a predetermined amount of time (such as an amount of time that is prescribed based on an amount of time required for lane change) from a stage earlier than completion of lane change by the own vehicle (such as before the start of lane change by the own vehicle), in conjunction with the blinker operation. As a result, when the driver operates the blinker and performs lane change, acceleration can be started earlier and the operation from lane change to overtaking of the preceding vehicle can be smoothly performed. The acceleration at this time is performed at a speed equal to or less than the preset vehicle speed set by the driver.

Here, in a state in which a vehicle is present ahead of the own vehicle in an adjacent lane that is adjacent to the traffic lane in which the own vehicle is traveling, even when the own vehicle is accelerated in conjunction with the operation of the blinker of the own vehicle, the own vehicle may be required to be immediately decelerated. In this case, reduced comfort in vehicle travel is a concern.

Specifically, as shown in FIG. 2 by (a), in a state in which no adjacent vehicle that is traveling in an adjacent lane 52 that is a traffic lane adjacent to an own lane 51 is present ahead of an own vehicle 40, because an obstacle that interferes with the acceleration of the own vehicle is not present on the route of the own vehicle, overtaking of a preceding vehicle 41 is smoothly performed by acceleration being performed in conjunction with the blinker-on of the own vehicle 40. In this regard, as shown in FIG. 2 by (b), in a state in which an adjacent vehicle 42 is traveling, should the own vehicle 40 be accelerated in conjunction with the blinker-on, the own vehicle may become close to the adjacent vehicle 42 before lane change, as a result of the lane change. In this case, a necessity for deceleration to be performed immediately after acceleration arises.

Therefore, according to the present embodiment, whether or not to perform acceleration of the own vehicle 40 in conjunction with the blinker operation during travel in which the preceding vehicle 41 is followed is determined based on whether or not the adjacent vehicle 42 is present traveling in the adjacent lane 52 among other vehicles that are present ahead of the own vehicle 40. As a result, in a state in which the likelihood of the own vehicle 40 being decelerated immediately after acceleration is high, the own vehicle 40 is not accelerated in the first place.

Specifically, as shown in FIG. 1, the vehicle control apparatus 10 includes a object recognizing unit 11, a boundary line recognizing unit 12, a preceding vehicle selecting unit 13, an adjacent vehicle selecting unit 14, and a traveling control unit 18. The object recognizing unit 11 recognizes an object that is present in the periphery of the own vehicle 40 based on the image data acquired from the imaging apparatus 21 and the distance measurement data acquired from the radar apparatus 22. Specifically, the object recognizing unit 11 detects the position of the object based on the distance measurement data, and recognizes the type of the object and the position of the object in the image based on the image data. In addition, when the position based on the distance measurement data and the position based on the image data are close, the positions are associated as belonging to a same object. Positional information of the object is acquired through fusion of data being performed. In addition, as a result of pattern matching using patterns prescribed in advance being performed on an image object, the type of the object captured by the imaging apparatus 21, such as whether the object is a vehicle, a pedestrian, or a bicycle, is identified.

The boundary line recognizing unit 13 recognizes a boundary line on the road, such as a white line. Specifically, image data is inputted from the imaging apparatus 21 and the boundary line recognizing unit 12 extracts edge points that serve as candidates for the boundary line from the image data based on a luminance change rate in a horizontal direction of the image and the like. In addition, Hough transform is performed on the extracted edge points, and a shape of the boundary line is recognized by feature points being connected. The boundary line recognizing unit 12 stores the recognized shape of the boundary line as boundary line information.

The preceding vehicle selecting unit 13 receives the object information from the object recognizing unit 11 and the boundary line information from the boundary line recognizing unit 12, and selects the preceding vehicle 41 using the inputted information.

The preceding vehicle 41 is a vehicle that travels on the route of the own vehicle 40. For example, the selection of the preceding vehicle 41 is such that, when the boundary line is recognized, the traffic lane (that is, the own lane 51) in which the own vehicle 40 is traveling is recognized from the boundary line and a vehicle ahead that is traveling in the own lane 51 is the preceding vehicle. When the boundary line is not recognized, the preceding vehicle is identified from a movement trajectory of the vehicle ahead. In addition, the preceding vehicle selecting unit 13 calculates preceding vehicle information that is information related to the preceding vehicle. The preceding vehicle information includes whether or not a preceding vehicle is present, an object number of the preceding vehicle, a relative distance of the preceding vehicle relative to the own vehicle, a relative speed of the preceding vehicle relative to the own vehicle, and the like.

The adjacent vehicle selecting unit 14 selects the adjacent vehicle from other vehicles present ahead of the own vehicle 40, based on a lateral position that is a relative position relative to the own vehicle in a direction orthogonal to a travelling direction of the own vehicle and a relative distance relative to the own vehicle in the travelling direction of the own vehicle.

Specifically, the adjacent vehicle selecting unit 14 includes a candidate extracting unit 15, an adjacent vehicle identifying unit 16, and an adjacent vehicle information calculating unit 17. The candidate extracting unit 15 receives the object information from the object recognizing unit 11, and extracts, as an adjacent vehicle candidate, a vehicle of which the relative distance is equal to or less than a predetermined distance Lth and that is present within a lateral position area (referred to, hereafter, as an "adjacent vehicle selection area") for determining the adjacent vehicle, from the vehicles present ahead of the own vehicle.

The adjacent vehicle identifying unit 16 selects, as the adjacent vehicle, a vehicle of which the relative distance relative to the own vehicle detected by the radar apparatus 22 is the shortest and that is determined to not be the preceding vehicle based on the preceding vehicle information from the preceding vehicle selecting unit 13, from the adjacent vehicle candidates extracted by the candidates extracting unit 15. Regarding a determination result that a vehicle is the adjacent vehicle, the adjacent vehicle identifying unit 16 maintains the vehicle selected as the adjacent vehicle in accompaniment with the start of operation of the blinker so as to remain selected as the adjacent vehicle for a predetermined amount of time after the start of operation of the blinker.

The adjacent vehicle selecting unit 14 selects each of a right-adjacent vehicle that is traveling in a traffic lane on the right side of the own vehicle and a left-adjacent vehicle that is traveling in a traffic lane on the left side of the own vehicle, as the adjacent vehicle. The adjacent vehicle information calculating unit 17 calculates adjacent vehicle information that is target information of the adjacent vehicle selected by the adjacent vehicle identifying unit 16. The adjacent vehicle information includes a target number of the adjacent vehicle, a relative distance D of the adjacent vehicle relative to the own vehicle, a relative speed W of the adjacent vehicle relative to the own vehicle, and the like.

The traveling control unit 18 calculates a control command value for actualizing various types of control for travelling assistance, and outputs the calculation results to the vehicle travelling unit 30. The vehicle travelling unit 30 is a means for performing travel travelling and braking of the vehicle. For example, the vehicle travelling unit 30 includes a fuel injection valve, an ignition apparatus, a throttle valve, and a brake apparatus of an engine. The various types of control for travelling assistance include following control to follow a preceding vehicle by the ACC function and blinker interlocking control for controlling an acceleration state of the own vehicle 40 in conjunction with the blinker operation of the own vehicle 40.

The traveling control unit 18 includes an acceleration determining unit 19a and a target acceleration calculating unit 19b as functions for actualizing the blinker interlocking control. The acceleration determining unit 19a determines whether or not the blinker of the own vehicle has switched from non-operating to operating during following control to follow a preceding vehicle and an adjacent vehicle is present ahead of the own vehicle in the direction indicated by the blinker of the own vehicle, based on the detection signal from the blinker sensor 24, the preceding vehicle information from the preceding vehicle selecting unit 13, and the adjacent vehicle information from the adjacent vehicle selecting unit 14. At this time, when an adjacent vehicle is not present in the direction indicated by the blinker, the acceleration determining unit 19a outputs an acceleration request to the target acceleration calculating unit 19b. Meanwhile, when an adjacent vehicle is present in the direction indicated by the blinker, the acceleration determining unit 19a determines whether or not to accelerate the own vehicle based on the relative speed W of the adjacent vehicle. Specifically, when the relative speed W of the adjacent vehicle is greater than a threshold Va (such as when the relative speed W of the adjacent vehicle is a positive value), the acceleration request is outputted to the target acceleration calculating unit 19b. When the relative speed W of the adjacent vehicle is equal to or less than the threshold Va (such as when the relative speed W of the adjacent vehicle is zero or negative), an acceleration suppression request is outputted to the target acceleration calculating unit 19b.

In the present specification, the acceleration when the own vehicle is accelerated frontward is expressed as "positive." The acceleration when the own vehicle is decelerated is expressed as "negative." The relative speed of another vehicle relative to the own vehicle is expressed as "positive" when the speed of the other vehicle is higher than that of the own vehicle, and "negative" when the speed of the other vehicle is lower than that of the own vehicle.

When the acceleration request is inputted from the acceleration determining unit 19a, the target acceleration calculating unit 19b sets the target acceleration to a positive value. When the acceleration suppression request is inputted, the acceleration determining unit 19a sets the target acceleration to zero. In addition, a control command value based on the set target acceleration is outputted to the vehicle travelling unit 30. As a result, the own vehicle is accelerated based on the target acceleration.

Next, an extraction method for the adjacent vehicle candidates by the candidate extracting unit 15 will be described in detail. According to the present embodiment, the adjacent vehicle selection area is prescribed based on whether or not the boundary line recognizing unit 12 recognizes a boundary line. Specifically, when the boundary line recognizing unit 12 recognizes a boundary line, the candidate extracting unit 15 sets the adjacent vehicle selection area in a left/right direction of the own vehicle with reference to the boundary line. Then, a vehicle that is present in the set adjacent vehicle selection area and of which the relative distance is equal to or less than the predetermined distance Lth is extracted as the adjacent vehicle candidate. Meanwhile, when the boundary line recognizing unit 12 does not recognize a boundary line, the adjacent vehicle selection area is set in the left/right direction of the own vehicle with reference to the own vehicle. Then, a vehicle that is present in the set adjacent vehicle selection area and of which the relative distance is equal to or less than the predetermined distance Lth is extracted as the adjacent vehicle candidate.

FIG. 3 shows the adjacent vehicle selection area when a boundary line is not recognized. FIG. 4 shows the adjacent vehicle selection area when a boundary line is recognized. The adjacent vehicle selection area is set on both left and right sides of the own vehicle 40 to select each of the left-adjacent vehicle and the right-adjacent vehicle. However, because the adjacent vehicle selection area is similarly set on the left and right, in FIG. 3 and FIG. 4, only the adjacent vehicle selection area on the right of the own vehicle 40 is shown. The description regarding the left side is omitted.

When no boundary line is recognized, an adjacent vehicle selection area WH is set ahead of the own vehicle 40 in the travelling direction thereof based on a lane width Wo of the road on which the own vehicle 40 is traveling, with reference to a center axis of the own vehicle 40. According to the present embodiment, as shown in FIG. 3 by (a), a lateral position X1 that is to the right side from a center axis O of the own vehicle 40 by only half the lane width Wo serves as a lower-limit lateral position, and a lateral position X2 that is further to the right side from the lateral position X1 by only the lane width Wo serves as an upper-limit lateral position. An area between the lower-limit lateral position and the upper-limit lateral position is set as the adjacent vehicle selection area WH. As a result of this method, the adjacent vehicle can be selected even in traffic lanes without boundary lines and in situations where the boundary line cannot be detected. However, in the case of this method, depending on the traveling position of the own vehicle 40 in the vehicle width direction, regardless of a vehicle (vehicle with the reference number 42 shown in FIG. 3 by (b)) actually being a vehicle that is traveling in the adjacent lane 52 adjacent to the own lane 51, the vehicle may not be selected as the adjacent vehicle. Alternatively, a vehicle 43 that is traveling in a traffic lane two lanes away from the own lane 51 may be selected as the adjacent vehicle (see FIG. 3 by (b)).

In this regard, when the boundary line is recognized, the adjacent vehicle selection area WH is set ahead of the own vehicle 40 in the travelling direction thereof based on the lane width Wo of the road on which the own vehicle 40 is traveling, with reference to a position of a boundary line 54 that divides the own lane 51 and the adjacent lane 52. Specifically, as shown in FIG. 4 by (a), a lateral position X3 of a right-side boundary line 54R that divides the own lane 51 and an adjacent lane 52R on the right side serves as the lower-limit lateral position, and a lateral position X4 further to the right side of the lateral position X3 by only the lane width Wo serves as the upper-limit lateral position. An area between the lower-limit lateral position and the upper-limit lateral position is set as the adjacent vehicle selection area WH. As a result of this method, the area corresponding to the lane width Wo from the right-side boundary line 54R is set as the adjacent vehicle selection area WH. Therefore, a vehicle 43 two lanes away from the own lane 51 can be suppressed from being erroneously selected as the adjacent vehicle (see FIG. 4 by (b)).

In addition, according to the present embodiment, when the state in which a boundary line is not recognized by the boundary line recognizing unit 12 changes to the state in which a boundary line is recognized, the adjacent vehicle selection area WH is instantly changed from the lateral position area prescribed with reference to the own vehicle to the lateral position area prescribed with reference to the boundary line. As a result, when the boundary line is able to be recognized, the adjacent vehicle candidate can be immediately extracted using accurate information.

Meanwhile, when the state in which a boundary line is recognized by the boundary line recognizing unit 12 changes to the state in which a boundary line is not recognized, the adjacent vehicle selection area WH is gradually changed from the lateral position area prescribed with reference to the boundary line to the lateral position area prescribed with reference to the own vehicle. Specifically, the lower-limit lateral position and the upper-limit lateral position of the adjacent vehicle selection area are respectively gradually changed from the lateral positions when the right-side boundary line 54R is recognized to the lateral positions prescribed with reference to the center axis O of the own vehicle 40. As a result, the width of the adjacent vehicle selection area WH is gradually changed. Consequently, in cases in which boundary line detection becomes unstable, frequent switching of the adjacent vehicle determination is suppressed.

A value of a typical lane width (such as 3.5 meters) may be used as the lane width Wo. Alternatively, a lane width that is estimated based on the image information acquired from the imaging apparatus 21 when a boundary line is able to be recognized may also be used as the lane width Wo. Alternatively, a lane width acquired from map information provided in a car navigation apparatus or the like provided in the own vehicle 40 may be used as the lane width Wo.

Next, a series of processes for the blinker interlocking control performed by the vehicle control apparatus 10 according to the present embodiment will be described with reference to a flowchart in FIG. 5. The blinker interlocking control in FIG. 5 is performed by the vehicle control apparatus 10 in accompaniment with input of a detection signal indicating that the blinker of the own vehicle has switched from off to on during traveling in which a preceding vehicle is followed.

Figure 5:
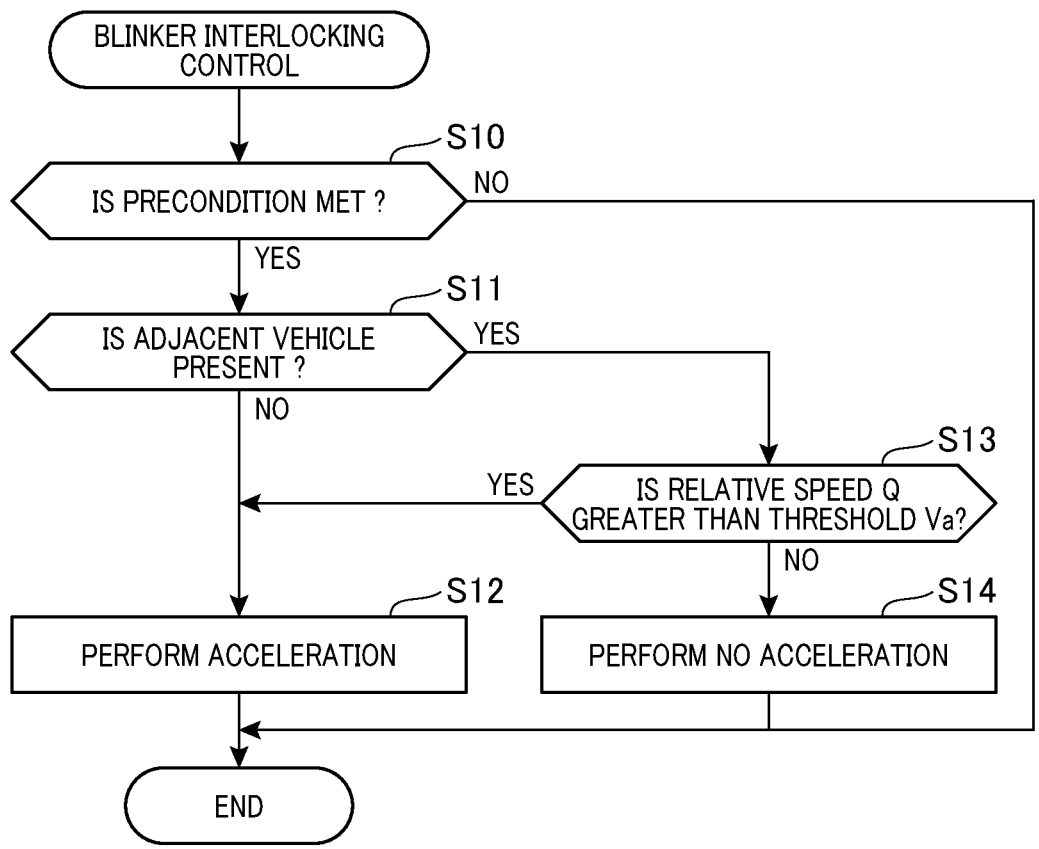
FIG. 5 is a flowchart of the processing steps for blinker interlocking control.

In FIG. 5, at step S10, whether or not a precondition for performing the blinker interlocking control is met is determined. According to the present embodiment, the precondition includes the vehicle speed of the own vehicle 40 detected by the vehicle speed sensor 23 being equal to or greater than a threshold Vth (such as 70 to 80 kilometers per hour). When the precondition is met, the vehicle control apparatus 10 proceeds to step S11 and determines whether or not an adjacent vehicle is selected in the adjacent lane in the direction indicated by the blinker. Regarding whether or not an adjacent vehicle is selected, an adjacent vehicle present flag is inputted from an adjacent vehicle selection process in FIG. 6, described hereafter, and the determination is made based on whether or not the flag is on.

When an adjacent vehicle is not selected in the adjacent lane in the direction indicated by the blinker, a negative determination is made at step S11. The vehicle control apparatus 10 proceeds to step S12 and accelerates the own vehicle. According to the present embodiment, when the own vehicle is traveling at a fixed speed or decelerating before the blinker operation, the target acceleration is set to a positive value and acceleration of the own vehicle is started. When the own vehicle is accelerating before the blinker operation, the acceleration is maintained.

Meanwhile, when an adjacent vehicle is selected in the adjacent lane in the direction indicated by the blinker, an affirmative determination is made at step S11. The vehicle control apparatus 10 proceeds to step S13 and determines whether or not the relative speed W of the adjacent vehicle relative to the own vehicle is greater than the threshold Va. When the relative speed W is greater than the threshold Va, the vehicle control apparatus 10 proceeds to step S12 and placed the own vehicle in an accelerated state. Meanwhile, when the relative speed W is equal to or less than the threshold Va, the vehicle control apparatus 10 proceeds to step S14 and does not perform the acceleration of the own vehicle in conjunction with the operation of the blinker. Specifically, when the own vehicle is traveling at a fixed speed before the blinker operation, the target acceleration remains set at zero. When the own vehicle is decelerating before the blinker operation, the deceleration is maintained. In addition, the own vehicle is accelerating before the blinker operation, the target acceleration is set to zero and acceleration is suppressed. The present process is then ended.

Next, the processing steps in the adjacent vehicle selection process will be described with reference to a flowchart in FIG. 6. The process is performed by the vehicle control apparatus 10 at every predetermined cycle.

Figure 6:
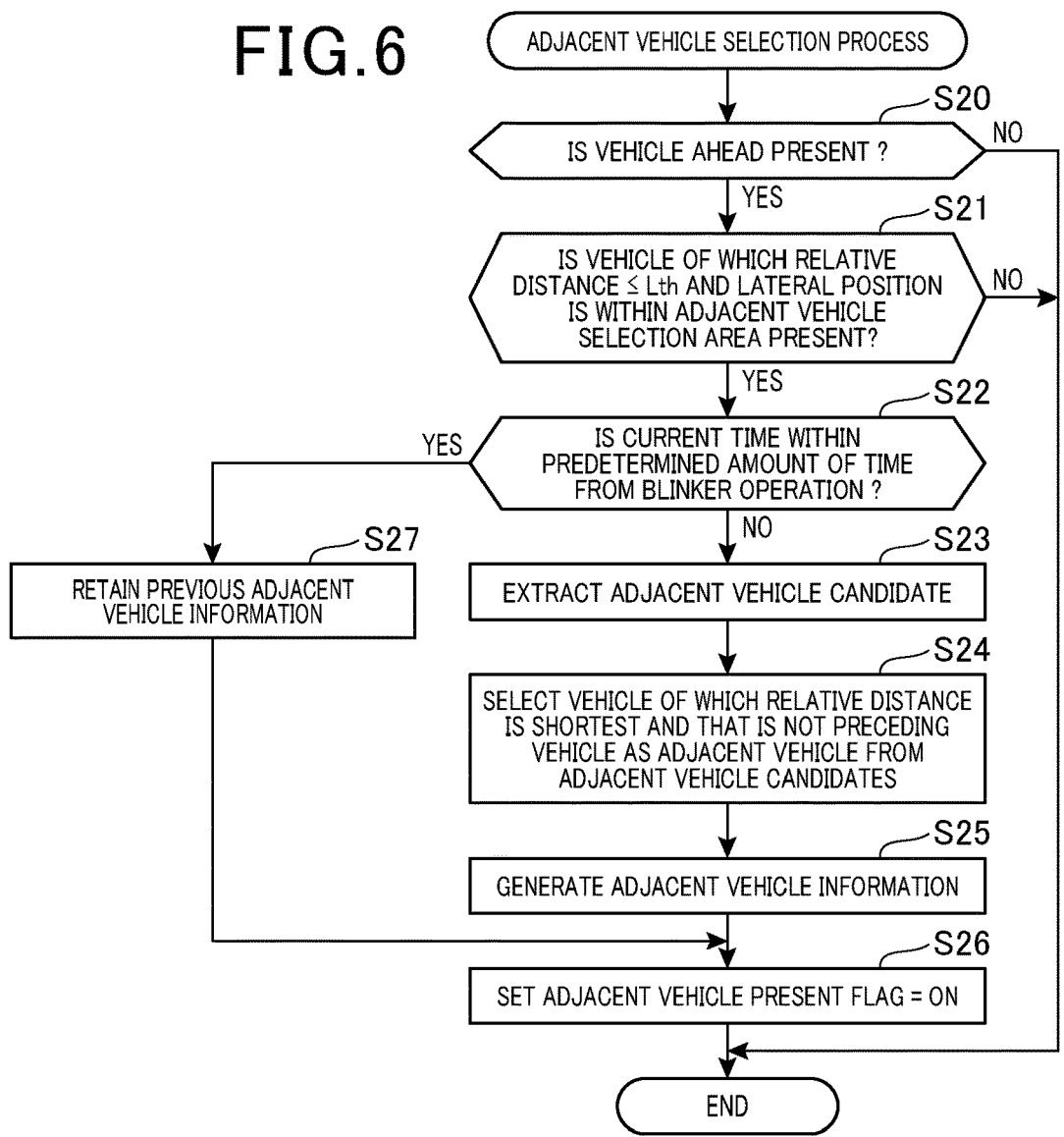
FIG. 6 is a flowchart of the processing steps in an adjacent vehicle selection process.

In FIG. 6, at step S20, whether or not a vehicle ahead that travels ahead of the own vehicle is present is determined. When a vehicle ahead is present, the vehicle control apparatus 10 proceeds to step S21 and determines whether or not a vehicle that meets two conditions, that is, (1) the relative distance relative to the own vehicle is equal to or less than the predetermined distance Lth and (2) the lateral position is within the adjacent vehicle selection area, is present among the vehicles ahead. Regarding above-described (2), the determination is made using the adjacent vehicle selection area set in a setting process in FIG. 7, below:

When an affirmative determination is made at step S21, the vehicle control apparatus 10 proceeds to step S22 and determines whether or not a current time is within a predetermined amount of time after the blinker of the own vehicle is switched from off to on. When the current time is within the predetermined amount of time after switching of the blinker, the vehicle control apparatus 10 proceeds to step S27 and retains the previous adjacent vehicle information. When the current time is not within the predetermined amount of time after switching of the blinker, the vehicle control apparatus 10 proceeds to step S23 and extracts a vehicle that meets the above-described conditions (1) and (2) as the adjacent vehicle candidate.

At subsequent step S24, the vehicle of which the relative distance is the shortest and that is not a preceding vehicle is selected as the adjacent vehicle from the adjacent vehicle candidates. At step S25, the adjacent vehicle information is generated. At step S26, the adjacent vehicle present flag is set to on. The adjacent vehicle present flag is a flag that is set to on when the adjacent vehicle is present and set to off when the adjacent vehicle is not present. The present routine is subsequently ended.

Next, the processing steps in the setting process for setting the adjacent vehicle selection area will be described with reference to a flowchart in FIG. 7. The process is performed by the vehicle control apparatus 10 at every predetermined cycle.

Figure 7:
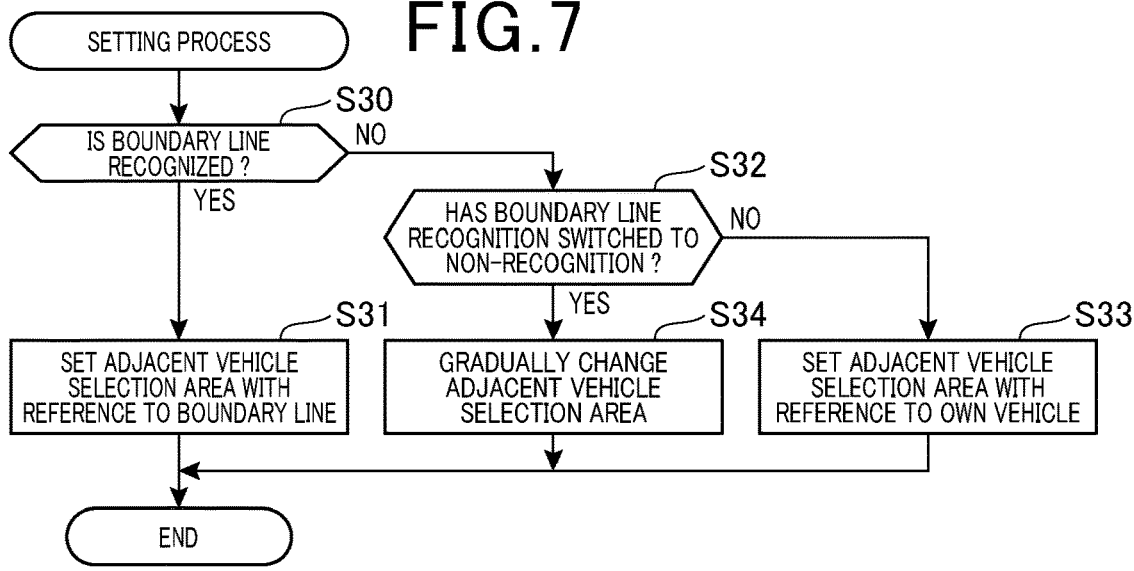
FIG. 7 is a flowchart of the processing steps in an adjacent vehicle selection area setting process.

In FIG. 7, at step S30, whether or not a boundary line is recognized is determined. When a boundary line is recognized, the vehicle control apparatus 10 proceeds to step S31 and sets the lateral position area prescribed with reference to the boundary line as the adjacent vehicle selection area. At a timing at which the state in which a boundary line is not recognized switches to the state in a boundary line is recognized, the adjacent vehicle selection area is instantly switched to the lateral position area prescribed with reference to the boundary line in accompaniment with the boundary line being recognized.

When a boundary line is not recognized, the vehicle control apparatus 10 proceeds to step S32 and determines whether or not the state in which a boundary line is recognized has switched to the state in which a boundary line is not recognized. When a negative determination is made at step S32, that is, when the state in which a boundary line is not recognized continues, the vehicle control apparatus 10 proceeds to step S33 and sets the lateral position area prescribed with reference to the own vehicle as the adjacent vehicle selection area.

Meanwhile, when the state in which a boundary line is recognized has switched to the state in which a boundary line is not recognized, the vehicle control apparatus 10 proceeds to step S34 and gradually changes the adjacent vehicle selection area from the lateral position area prescribed with reference to the boundary line to the lateral position area prescribed with reference to the own vehicle. According to the present embodiment, an amount of time (such as several hundred milliseconds) over which the lateral position area is gradually changed is predetermined. The lateral position area is gradually slid in the leftward direction or the rightward direction during the gradual change time. The present routine is thereby ended.

According to the present embodiment described in detail above, the following advantageous effects are obtained.

The configuration is such that a vehicle that is traveling in an adjacent lane of the own vehicle is identified based on the lateral positions and relative distances of other vehicles with reference to the own vehicle, and selected as the adjacent vehicle. Acceleration of the own vehicle in conjunction with the blinker operation is performed based on whether or not the adjacent vehicle is selected. When the own vehicle is accelerated in accompaniment with the operation of the own vehicle blinker regardless of whether a vehicle is present in the adjacent lane ahead of the own vehicle, deceleration of the own vehicle may be required immediately after acceleration. Meanwhile, when an adjacent vehicle is not present, it is preferable that smooth overtaking of a preceding vehicle be able to be actualized by acceleration of the own vehicle being performed in conjunction with the operation of the own vehicle blinker. In this regarding, as a result of the above-described configuration, whether or not to accelerate the own vehicle can be determined based on the presence/absence of a vehicle present in the adjacent lane. Vehicle behavior that matches the feeling of the driver can be obtained.

The configuration is such that, when the boundary line that divides the own lane 51 and the adjacent lane 52 is recognized by the imaging apparatus 21, the adjacent vehicle selection area is set to the lateral position area prescribed with reference to the boundary line that divides the own lane 51 and the adjacent lane 52. A vehicle that is present within the lateral position area is extracted as the adjacent vehicle candidate. As a result of this configuration, the adjacent vehicle selection area can be set based on the traveling position of the own vehicle 40. Consequently, even when the own vehicle 40 is traveling towards the right or towards the left within the own lane 51, a vehicle that is actually not in the adjacent lane 52 being erroneously selected as the adjacent vehicle can be suppressed.

Meanwhile, the configuration is such that, when the boundary line that divides the own lane 51 and the adjacent lane 52 is not recognized by the imaging apparatus 21, the adjacent vehicle selection area is set to the lateral position area prescribed with reference to the position of the own vehicle 40. A vehicle that is present within the lateral position area is extracted as the adjacent vehicle candidate. As a result of this configuration, the adjacent vehicle can be selected even in cases in which the boundary line cannot be recognized or cases in which the own vehicle is traveling on a road that has no boundary lines.

The configuration is such that, when the state in which the boundary line 54 is recognized changes to the state in which the boundary line 54 is not recognized, the adjacent vehicle selection area is gradually changed from the lateral position area prescribed with reference to the boundary line 54 to the lateral position area prescribed with reference to the own vehicle 40. When the lateral position area prescribed with reference to the boundary line 54 instantly changes to lateral position area prescribed with reference to the own vehicle 40 in accompaniment with the boundary line 54 no longer being recognized, it can be considered that the adjacent vehicle selection area may significantly move in the left/right direction depending on the traveling position of the own vehicle 40 and determination accuracy regarding the adjacent vehicle may instead decrease. In addition, in an unstable state such as that in which detection and non-detection of the boundary line are repeated, frequent switching of the adjacent vehicle determination is a concern. In this regard, as a result of the above-described configuration, decrease in the determination accuracy regarding the adjacent vehicle when the boundary line is no longer recognized can be suppressed.

The configuration is such that, when the state in which the boundary line 54 is not recognized changes to the state in which the boundary line 54 is recognized, the adjacent vehicle selection area instantly changes from the lateral position area prescribed with reference to the own vehicle 40 to the lateral position area prescribed with reference to the boundary line 54. As a result of the adjacent vehicle selection area being prescribed with reference to the boundary line 54, erroneous selection of the adjacent vehicle attributed to the traveling position of the own vehicle within the own lane 51 can be suppressed. Therefore, as a result of the above-described configuration, when the boundary line is recognized, the adjacent vehicle candidates can be extracted using information that has higher accuracy regarding adjacent vehicle determination.

The configuration is such that the vehicle that is selected as the adjacent vehicle in accompaniment with the start of operation of the blinker remains selected as the adjacent vehicle over the predetermined amount of time after the start of operation of the direction indicator of the own vehicle 40. When the own vehicle 40 performs a lane change after the operation of the blinker, the vehicle that is the adjacent vehicle before the lane change is now no longer the vehicle that is traveling in the adjacent lane and becomes the next preceding vehicle. That is, the object that is selected as the adjacent vehicle changes as a result of lane change. As a result of the above-described configuration being achieved taking this point into consideration, occurrence of acceleration variations that are uncomfortable to the driver can be suppressed.

The configuration is such that a vehicle of which the relative distance relative to the own vehicle 40 is the shortest and that is not present on the route of the own vehicle 40, that is, a vehicle that is not the preceding vehicle is selected as the adjacent vehicle from the adjacent vehicle candidates. As a result of such a configuration, when acceleration of the own vehicle 40 is performed in accompaniment with the operation of the blinker, an object that results in unnecessary acceleration can be selected as the adjacent vehicle.

Whether or not acceleration of the own vehicle 40 is required differs based on the traveling state of the adjacent vehicle. For example, when the speed of the adjacent vehicle is higher than that of the own vehicle 40, unnecessary deceleration is not required to be performed even when the own vehicle 40 is accelerated, and smooth overtaking of the preceding vehicle can be actualized. Meanwhile, when the speed of the adjacent vehicle is lower than that of the own vehicle 40, as a result of acceleration of the own vehicle 40 being performed, deceleration may be required to be performed immediately after acceleration. In light of such points, the configuration is such that, when the adjacent vehicle is determined to be present, whether or not acceleration of the own vehicle 40 in conjunction with the operation of the blinker is performed is determined based on the relative speed of the adjacent vehicle relative to the own vehicle. As a result of such a configuration, acceleration of the own vehicle 40 can be suppressed in a state in which deceleration is required to be performed immediately after acceleration, and comfort in traveling is ensured. Meanwhile, even when the adjacent vehicle is present, in a state in which deceleration is not required to be performed immediately after acceleration, acceleration of the own vehicle 40 can be proactively performed. As a result, smooth overtaking of the preceding vehicle 41 can be obtained.

Other Embodiments

The present disclosure is not limited to the above-described embodiment. For example, the present disclosure may be implemented in the following manner.

According to the above-described embodiment, the configuration is such that, when a boundary line is recognized, the vehicle that is present within the lateral position area prescribed with reference to the boundary line is selected as the adjacent vehicle from the vehicles ahead. However, the configuration may be such that the vehicle present within the lateral position area prescribed with reference to the own vehicle is selected as the adjacent vehicle regardless of whether or not the boundary line is recognized.

According to the above-described embodiment, the configuration is such that, when the state in which a boundary line is recognized changes to the state in which a boundary line is not recognized, the adjacent vehicle selection area is gradually changed from the lateral position area prescribed with reference to the boundary line to the lateral position area prescribed with reference to the own vehicle. However, the configuration may be such that the adjacent vehicle selection position is instantly changed, instead of the configuration in which the adjacent vehicle selection position is gradually changed. In addition, the configuration may be such that, when the state in which a boundary line is not recognized changes to the state in which a boundary line is recognized, the adjacent vehicle selection area is gradually changed from the lateral position area prescribed with reference to the own vehicle to the lateral position area prescribed with reference to the boundary line.

According to the above-described embodiment, the own vehicle is accelerated based on the relative speed of the adjacent vehicle relative to the own vehicle. However, whether or not to accelerate the own vehicle may be controlled based solely on the presence absence of the adjacent vehicle, without taking into consideration the relative speed of the adjacent vehicle. Specifically, control is performed such that the own vehicle is accelerated in accompaniment with the operation of the own vehicle blinker when the adjacent vehicle present flag is on, and the own vehicle is not accelerated even when the own vehicle blinker is operated when the adjacent vehicle present flag is off.

The size of the adjacent vehicle selection area is not limited to the vehicle width Wo of the road on which the own vehicle is traveling, and may have a narrower lateral width that the lane width Wo or a wider lateral width than the lane width Wo.

According to the above-described embodiment, the adjacent vehicle selection area is set in the right lane and the left lane relative to the own vehicle. However, the adjacent vehicle selection area may be set in only either of the left and right. For example, when overtaking from the left side is prohibited by law, the adjacent vehicle selection area may be set in only the right lane relative to the own vehicle.

The mode in which the adjacent vehicle selection area is gradually changed during switching from boundary line recognition to non-recognition is not limited to that according to the above-described embodiment. For example, the configuration may be such that the adjacent vehicle selection area is gradually changed by either of the lower-limit lateral position and the upper-limit lateral position of the adjacent vehicle selection area being gradually changed from the lateral position when the boundary line 54 is recognized to the lateral position prescribed using the lane width Wo to the center axis O of the own vehicle 40 and, with reference to the lateral position, the area of a width corresponding to the lane width Wo being set as the adjacent vehicle selection area.

According to the present embodiment, the configuration is such that, when the own vehicle 40 is accelerating when the blinker of the own vehicle 40 is operated during traveling in which the preceding vehicle 41 is followed, the target acceleration is maintained as is and the acceleration before the blinker operation is maintained. However, the configuration may be such that the target acceleration is changed to an increasing side in accompaniment with the blinker of the own vehicle 40 being operated during traveling in which the preceding vehicle 41 is followed and further acceleration is performed.

The adjacent vehicle selection process of the present disclosure may be applied to a configuration in which acceleration control of the own vehicle is performed in conjunction with the operation of the own vehicle blinker based on the presence/absence of the adjacent vehicle when the preceding vehicle is not present. Specifically, regarding this acceleration control, when the preceding vehicle is not present and the adjacent vehicle is faster than the own vehicle, the traveling state before operation of the own vehicle blinker is maintained when the own vehicle blinker is operated. In addition, when the preceding vehicle is not present and the adjacent vehicle is slower than the own vehicle, the own vehicle is not accelerated when the own vehicle blinker is operated, and acceleration is suppressed when the own vehicle is accelerating before the operation of the own vehicle blinker. In such a configuration, identification of the adjacent vehicle may be performed by the processes in FIG. 6 and FIG. 7.

According to the above-described embodiment, the system in which the radar apparatus 22 is mounted as a distance measurement apparatus is described. However, this is not limited thereto. For example, an arbitrary distance measurement apparatus such as a locator or a lidar can be used. In addition, the radar apparatus 22 may not be provided, and the imaging apparatus 21 may be given functions as the distance measurement apparatus. In this case, the imaging apparatus 21 is preferably a multi-lens camera, such as a stereo camera.

According to the above-described embodiment, the configuration is such that the present disclosure is applied to a system in which the vehicle control apparatus 10 provides the ACC function. However, the vehicle control apparatus 10 may be applied to a system that does not have the ACC function. In addition, the function of the vehicle control apparatus 10 is not limited to ACC. For example, the vehicle control apparatus 10 may provide a lane change support (LCS) function for issuing a warning to the driver during lane change of the own vehicle and restricting lane change, a function for avoiding collision and mitigating collision damage by operating the brakes and the like when the inter-vehicle distance to the preceding vehicle becomes short, or control in which low-speed travelling during traffic congestion is made automatic.

As the precondition for performing the blinker interlocking control, a condition other than the vehicle speed condition may be included. For example, when the vehicle control system 10 provides the LCS function, lane change being allowed by the LCS function may be included in the precondition. In this case, the processes at step S11 and subsequent steps in FIG. 5 are performed under a condition that lane change is allowed by the LCS function.

The above-described constituent elements are conceptual and are not limited to those according to the above-described embodiment. For example, a function provided by a single constituent element may be actualized by being dispersed among a plurality of constituent elements. Functions provided by a plurality of constituent elements may be actualized by a single constituent element.

While the present disclosure has been described with reference to embodiments thereof, it is to be understood that the disclosure is not limited to the embodiments and structures. The present disclosure is intended to cover various modification examples and modifications within the range of equivalency. In addition, various combinations and configurations, and further, other combinations and configurations including more, less, or only a single element thereof are also within the spirit and scope of the present disclosure.

The invention claimed is:

1. A vehicle control apparatus that performs during-following control in which, for a state in which a direction indicator of an own vehicle is operated during traveling in which a preceding vehicle is followed, the own vehicle is accelerated in conjunction with operation of the direction indicator, the vehicle control apparatus comprising:
   a boundary line recognizing unit that recognizes a boundary line on a road based on an image of a peripheral environment including the road, the image being captured by an imaging apparatus that is mounted in the own vehicle;
   an adjacent vehicle selecting unit that selects, from other vehicles that are present ahead of the own vehicle, an adjacent vehicle that is traveling in an adjacent lane that is adjacent to a traveling lane of the own vehicle based on a lateral position that is a relative position relative to the own vehicle in a direction orthogonal to a travelling direction of the own vehicle and a relative distance to the own vehicle in the travelling direction of the own vehicle; and
   an acceleration control unit that performs acceleration of the own vehicle by the during-following control based on whether the adjacent vehicle is selected by the adjacent vehicle selecting unit for a state in which the direction indicator is operated during following-traveling, wherein:
   the adjacent vehicle selecting unit selects, from the other vehicles, a vehicle that is present within a lateral position area prescribed with reference to the boundary line as the adjacent vehicle that is prescribed based on a lane width of the road on which the own vehicle is travelling, for a state in which the boundary line is recognized by the boundary line recognizing unit; and
   the adjacent vehicle selecting unit selects, from the other vehicles, a vehicle that is present within a lateral position area prescribed with reference to the own vehicle as the adjacent vehicle that is prescribed based on the lane width of the road on which the own vehicle is travelling, for a state in which the boundary line is not recognized by the boundary line recognizing unit.

2. The vehicle control apparatus according to claim 1, wherein:
   the adjacent vehicle selecting unit gradually changes a lateral position area that serves as a selection area for the adjacent vehicle from the lateral position area prescribed with reference to the boundary line to the lateral position area prescribed with reference to the own vehicle, for a state in which the boundary line is recognized by the boundary line recognizing unit changes to a state in which the boundary line is not recognized.

3. The vehicle control apparatus according to claim 2, wherein:
   the adjacent vehicle selecting unit instantly changes a lateral position area that serves as a selection area for the adjacent vehicle from the lateral position area prescribed with reference to the own vehicle to the lateral position area prescribed with reference to the boundary line, for a state in which the boundary line is not recognized by the boundary line recognizing unit changes to a state in which the boundary line is recognized.

4. The vehicle control apparatus according to claim 3, wherein:
   the adjacent vehicle selecting unit keeps a vehicle selected as the adjacent vehicle in accompaniment with a start of operation of the direction indicator so as to remain selected as the adjacent vehicle, during a predetermined amount of time after the start of operation of the direction indicator.

5. The vehicle control apparatus according to claim 4, wherein:
   the adjacent vehicle selecting unit selects, from the other vehicles, a vehicle of which the relative distance is the shortest and that is not a preceding vehicle as the adjacent vehicle.

6. The vehicle control apparatus according to claim 1, wherein:
   the adjacent vehicle selecting unit keeps a vehicle selected as the adjacent vehicle in accompaniment with a start of operation of the direction indicator so as to remain selected as the adjacent vehicle, during a predetermined amount of time after the start of operation of the direction indicator.

7. The vehicle control apparatus according to claim 1, wherein:
   the adjacent vehicle selecting unit selects, from the other vehicles, a vehicle of which the relative distance is the shortest and that is not a preceding vehicle as the adjacent vehicle.

8. A vehicle control method for performing during-following control in which, for a state in which a direction indicator of an own vehicle is operated during traveling in which a preceding vehicle is followed, the own vehicle is accelerated in conjunction with operation of the direction indicator, the vehicle control method comprising:
   recognizing a boundary line on a road based on an image of a peripheral environment including the road, the image being captured by an imaging apparatus that is mounted in the own vehicle;
   selecting, from other vehicles that are present ahead of the own vehicle, an adjacent vehicle that is traveling in an adjacent lane that is adjacent to a traveling lane of the own vehicle based on a lateral position that is a relative position relative to the own vehicle in a direction orthogonal to a travelling direction of the own vehicle and a relative distance to the own vehicle in the travelling direction of the own vehicle;

performing acceleration of the own vehicle by the during-following control based on whether the adjacent vehicle is selected for a state in which the direction indicator is operated during following-traveling;

selecting, from the other vehicles, a vehicle that is present within a lateral position area prescribed with reference to the boundary line as the adjacent vehicle that is prescribed based on a lane width of the road on which the own vehicle is travelling, for a state in which the boundary line is recognized; and selecting, from the other vehicles, a vehicle that is present within a lateral position area prescribed with reference to the own vehicle as the adjacent vehicle that is prescribed based on the lane width of the road, for a state in which the boundary line is not recognized.

9. A vehicle control apparatus that performs during-following control in which, for a state in which a direction indicator of an own vehicle is operated during traveling in which a preceding vehicle is followed, the own vehicle is accelerated in conjunction with operation of the direction indicator, the vehicle control apparatus comprising:

a boundary line recognizing unit that recognizes a boundary line on a road based on an image of a peripheral environment including the road, the image being captured by an imaging apparatus that is mounted in the own vehicle;

an adjacent vehicle selecting unit that selects, from other vehicles that are present ahead of the own vehicle, an adjacent vehicle that is traveling in an adjacent lane that is adjacent to a traveling lane of the own vehicle based on a lateral position that is a relative position relative to the own vehicle in a direction orthogonal to a travelling direction of the own vehicle and a relative distance to the own vehicle in the travelling direction of the own vehicle; and an acceleration control unit that performs acceleration of the own vehicle by the during-following control based on whether the adjacent vehicle is selected by the adjacent vehicle selecting unit for a state in which the direction indicator is operated during following-traveling, wherein:

the adjacent vehicle selecting unit selects, from the other vehicles, a vehicle that is present within a lateral position area prescribed with reference to the boundary line as the adjacent vehicle that is prescribed based on a lane width of the road on which the own vehicle is travelling, for a state in which the boundary line is recognized by the boundary line recognizing unit;

the adjacent vehicle selecting unit selects, from the other vehicles, a vehicle that is present within a lateral position area prescribed with reference to the own vehicle as the adjacent vehicle that is prescribed based on the lane width of the road on which the own vehicle is travelling, for a state in which the boundary line is not recognized by the boundary line recognizing unit; and the adjacent vehicle selecting unit instantly changes a lateral position area that serves as a selection area for the adjacent vehicle from the lateral position area prescribed with reference to the own vehicle to the lateral position area prescribed with reference to the boundary line, for a state in which the boundary line is not recognized by the boundary line recognizing unit changes to a state in which the boundary line is recognized.

* * * * *